United States Patent [19]

Akao et al.

[11] Patent Number: 5,532,028

[45] Date of Patent: Jul. 2, 1996

[54] EASILY OPENABLE PACKAGE OF PHOTOGRAPHIC PHOTOSENSITIVE MATERIALS AND PRODUCING THE SAME

[75] Inventors: Mutsuo Akao; Hiroyuki Osanai; Makoto Kawamura, all of Kanagawa, Japan

[73] Assignee: Fuji Photo Film Co., Ltd., Minami-Ashigara, Japan

[21] Appl. No.: 904,456

[22] Filed: Jun. 26, 1992

[30] Foreign Application Priority Data

Jun. 28, 1991 [JP] Japan ................................ 3-158957

[51] Int. Cl.⁶ ........................... B65D 85/00; B32B 7/04; B32B 7/14
[52] U.S. Cl. .................. 428/35.2; 428/35.3; 428/76; 428/124; 428/194; 428/200; 428/212; 206/455; 206/484.2; 383/205; 383/88
[58] Field of Search ................. 428/35.2, 194, 428/35.3, 68, 76, 349, 200, 212, 121, 124; 206/455, 484.2; 383/205, 88

[56] References Cited

U.S. PATENT DOCUMENTS

| | | | |
|---|---|---|---|
| 4,252,846 | 2/1981 | Romesberg et al. | 428/35.2 |
| 4,337,862 | 7/1982 | Suter | 428/349 |
| 4,407,872 | 10/1983 | Horii | 428/35.3 |
| 4,574,104 | 3/1986 | Aishima et al. | 428/349 |
| 4,708,896 | 11/1987 | Akao | 428/35.2 |
| 4,780,357 | 10/1988 | Akao | 428/35.2 |
| 4,876,125 | 10/1989 | Akao et al. | 428/194 |
| 4,894,264 | 1/1990 | Akao et al. | 428/124 |
| 5,026,600 | 6/1991 | Akao | 428/35.3 |
| 5,141,795 | 8/1992 | Kai et al. | 428/349 |

FOREIGN PATENT DOCUMENTS 60-7172  3/1985  Japan .

*Primary Examiner*—Ellis P. Robinson
*Assistant Examiner*—Rena L. Dye
*Attorney, Agent, or Firm*—Burns, Doane, Swecker & Mathis

[57] ABSTRACT

An easily openable package of photographic photosensitive materials which comprises one or a plurality of photographic photosensitive materials and a light-shielding bag having a heat-sealed portion formed on the periphery and packaging the photographic photosensitive materials. The heat-sealed portion comprises a strongly joined portion and a weakly joined portion, the part surrounded by the strongly joined portion being larger than the photographic photosensitive materials being placed therein with a space, and the light-shielding bag being turned over at least at the edge of the photographic photosensitive materials on the opening side. The package is very easily openable and can ensure sealability, heat sealing properties and physical strength sufficiently.

15 Claims, 4 Drawing Sheets

EASILY OPENABLE PACKAGE OF PHOTOGRAPHIC PHOTOSENSITIVE MATERIALS AND PRODUCING THE SAME

BACKGROUND OF THE INVENTION

This invention relates to an easily openable package of photographic photosensitive materials which is very easily openable by hand and a method of producing the same.

Heretofore, several packaging materials having good openability are known for light-shielding bags for photographic photosensitive materials. A conventional easily openable packaging material for photographic photosensitive materials is composed of a light-shielding heat sealing film layer containing a lubricant, a light-shielding material and more than 50 wt. % of LDPE resin, an aluminum foil layer, on which an anchor coat layer is formed, laminated onto the light-shielding heat sealing film layer with a peeling strength of more than 400 g/15 mm width, and a heat-resistant flexible sheet layer having a heat resistance higher than the light-shielding heat sealing film layer by more than 5° C. laminated onto the aluminum foil layer see U.S. Pat. No. 4,708,896. In the packaging material, since LDPE resin is used in order to ensure the tearability by hand, heat sealability and physical strength are inferior. When the packaging material was used for packaging a photographic photosensitive material having a weight of more than 500 g, pinholes and separation of the sealed portion tended to occur resulting in the loss of light-shielding, gas barrier and the like.

Another conventional easily openable packaging material is provided with a prescribed resin layer between two packaging material surfaces, and thereby, both packaging material surfaces are easy to separate (Japanese Utility Model KOKOKU No.60-7172). When the packaging material was used for packaging a photographic photosensitive material having a weight of more than 500 g, the sealed portion tended to separate due to the heat seal strength which is rendered small. Therefore, this packaging material is unsuitable for packaging photographic photosensitive materials.

SUMMARY OF THE INVENTION

An object of the invention is to provide an easily openable package of photographic photosensitive materials which is very easily openable and can ensure sealability, heat sealing properties and physical strength sufficiently.

The present invention provides an easily openable package of photographic photosensitive materials which has achieved the above object, and comprises one or a plurality of photographic photosensitive materials and a light-shielding bag having a heat-sealed portion formed on the periphery the packages the photographic photosensitive materials, the heat-sealed portion comprising a strongly joined portion and a weakly joined portion, the part surrounded by the strongly joined portion being larger than the photographic photosensitive materials being placed therein with a space, and the light-shielding bag being turned over at least at the edge of the photographic photosensitive materials on the opening side.

Figure 1:
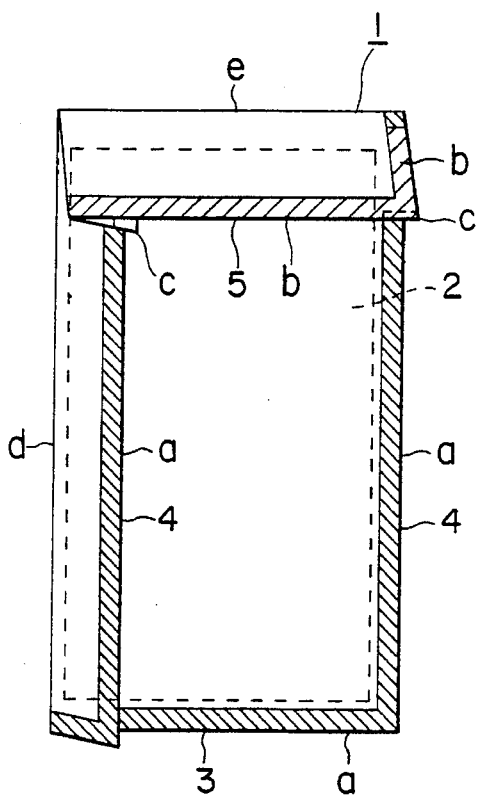
FIG. 1 is a plan view of an easily openable package of photographic photosensitive materials which embodies the invention.

1. Light-shielding bag
2. Photographic photosensitive materials
3. Bottom portion
4. Side portion
5. Top portion
11. Strongly joining layer
12. Weakly joining layer
a. Strongly joined portion
b. Weakly joined portion
c. Unjoined portion
d,e. Turned over portion

DETAILED DESCRIPTION OF THE INVENTION

In the light-shielding bag of the invention, the periphery is heat-sealed, and the heat-sealed portion comprises a strongly joined portion which ensures sealability and a weakly joined portion. A preferred relationship in joining strength is;

$$A \leq 0.7B$$

A: Joining strength of the weakly joined portion
B: Joining strength of the strongly joined portion When the joining strength relationship value exceeds 0.7, opening; easily by hand is difficult. The joining strength of the weakly joined portion is easily openable by hand, and is actually 10 to 1200 g/15 mm width, preferably 50 to 1000 g/15 mm width, particularly preferably 100 to 700 g/15 mm width as T peeling strength at a peeling speed of 300 mm/min. The joining strength of the strongly joined portion is preferably not less than 1300 g/15 mm width, particularly preferably not less than 1500 g/15 mm width as the T peeling strength in order to ensure various necessary properties as a packaging bag for photographic photosensitive materials, such as sealability, peeling resistance, resistance to the occurrence of pinholes, light-shielding and heat seal strength.

The part surrounded by the strongly joined portion is rendered larger than the photographic photosensitive materials with a space. A preferred space, i.e. the distance between the edge of the photographic photosensitive materials on the opening side and end of the folded portion, is 5 to 50 mm, particularly 10 to 30 mm in the opening direction (Y direction in FIG. 2) in order to ensure resistance to the occurrence of pinholes, light-shielding, sealability and the like.

The length in the opening direction of the weakly joined portion is preferably 3 to 60 mm, more preferably 5 to 50 mm, particularly preferably 10 to 30 mm, and the length in the width direction (X direction in FIG. 2) is more than the size of the photographic photosensitive materials, preferably 5 to 60 mm greater, particularly preferably 10 to 40 mm greater.

The strongly joined portion and the weakly joined portion are formed by stripe coating a weakly joining layer onto the part corresponding to a weakly joined portion, by stripe coating a strongly joining layer onto a strongly joined portion, by forming a weakly joined portion by controlling heat sealing pressure, temperature, time and the like without forming a weakly joined portion or a strongly joining layer, by stripe coating a weakly joining layer onto only one side of the light-shielding film contructing the light-shielding bag, or the like. The stripe coating of the weakly joining layer is conducted by solution coating, hot melt applicator coating, extrusion laminate coating, or the like.

Representative resins used for the weakly joining layer are various waxes, such as vegetable wax, animal wax, mineral wax, petroleum wax, coal synthetic wax, polyethylene wax, oil or fat synthetic wax, compounded wax and emulsion wax, mixed thermally adhesive resins wherein 2 or more thermoplastic resins are mixed, such as blends of crystalline polypropylene resin, high density homopolyethylene resin and ethylene-vinyl acetate copolymer resin, blends of crystalline polypropylene resin and medium, high density polyethylene resin, blends of L-LDPE resin, a styrene hydrocarbon-conjugated diene hydrocarbon block copolymer resin and styrene or styrene-butadiene graft copolymer resin, blends of ethylene-butene-1 random copolymer resin, polyolefin resin and styrene resin, blends of styrene-butadiene block copolymer resin and amorphous or low crystalline polyolefin resin, blends of ethylene-vinyl acetate copolymer graft polymerized with styrene monomer and low density polyethylene resin and blends of ethylene-vinyl acetate copolymer resin, styrene-butadiene block copolymer resin, various hot melt adhesives represented by ethylene-vinyl acetate copolymer hot melt adhesive, vinyl chloride-vinyl acetate copolymer lacquer, Mg type ionomer, Na type ionomer, low molecular weight polyethylene resin, high melt index polyolefin resin, etc. However, the resins used for the weakly joining layer are not limited to the above resins, and the weakly joining layer can be formed by controlling the layer thicknesss, the resin composition, such as the kind of resin, the kind of additives and blending ratio, heat sealing conditions, the relationship with the layer to be heat-sealed due to being identical or a different layer.

Representatitve resins used for the strongly joining layer are ethylene-α-olefin copolymer resin (L-LDPE), various other ethylene copolymer resins, low, medium, high density polyethylene resins, adhesive polyolefin resins (modified polyolefin resin), polyolefin resins containing more than 5 wt. % of ethylene copolymer resin and a, lubricant, polyolefin resin containing more than 50 wt. % in total of one or more of the above resins, etc. However, the resins used for the strongly joining layer are not limited to the above resins, and the strongly joining layer can be formed by controlling the layer thickness, the resin composition, such as the kind of resin, the kind of additives and blending ratio, heat sealing conditions, the relationship with the layer to be heat-sealed due to being identical or different a layer.

Particularly preferred resins for the strongly joining layer are ethylene copolymer resins and adhesive polyolefin resins.

Suitable ethylene copolymer resins are ethylene-vinyl acetate copolymer resin, ethylene-propylene copolymer resin, ethylene-1-butene copolymer resin, ethylene-butadiene copolymer resin, ethylene-vinyl chloride copolymer resin, ethylene-methylmethacrylate copolymer resin, ethylene-methyl acrylate copolymer resin, ethylene-ethyl acrylate copolymer (EEA) resin, ethylene-acrylonitrile copolymer resin, ethylene-acrylic acid copolymer resin, ionomer resin (copolymer of ethylene and unsaturated acid crosslinked using metal such as zinc), ethylene-α-olefin copolymer (L-LDPE) resin, ethylene-propylene-butene-αternary copolymer resin, and the like. Among the above ethylene copolymer resins, L-LDPE resin and EEA resin are preferred, because they are excellent in film moldability and heat sealing properties and are great in bag rupture strength, impact puncture strength and tear strength. L-LDPE resin is particularly preferred.

In order to adjust the properties to be necessary, it is preferred to blend with other thermoplastic resins, rubbers, various additives or modifiers.

The L-LDPE resin is called third polyethylene resin, and it is a low cost high strength resin, having the advantages of both low, medium density polyethylene resin and high density polyethylene resin, which meets the requirements, i.e. resource conservation and energy conservation, of the times. The L-LDPE resin is a copolymer of ethylene and α-olefin, and it has a linear structure having short branched. The number of carbon atoms of the α-olefin is 3 to 13. Preferable α-olefin has a number of carbon atoms of 4 to 10, and examples of the α-olefin are butene-1, 4-methylpentene-1, hexene-1, heptene-1 and octene-1. The density is usually in the range of 0.87 to 0.95 g/cm$^3$, and the melt index in usually 0.1 to 50 g/10 minutes. Most of the L-LDPE resin is synthesized by low pressure method, and partly synthesized by modified high pressure method. Examples of commercial L-LDPE resin are "G-Resin" and "TUFLIN" and "NUC-FLX" (UCC), "NUC Polyethylene-LL" and "TUFTHENE" (Nippon Unicar) "Excelene VL" (Sumitomo Chemical), "Idemitsu Polyethylene-L" and "Moretec" (Idemitsu Petrochemical), "Dowlex" (Dow chemical), "Suclear" (Dupont de Nemour, Canada), "Marlex" (Phillips), "Neozex" and "Ultzex" (Mitsui Petrochemical Industries), "Nisseki Linirex" (Nippon Petrochemicals), "Mitsubishi Polyethy-LL" (Mitsubishi Petrochemical), "Stamilex" (DSM), and the like. Preferable L-LDPE resins are copolymers of ethylene and α-olefin of which the number of carbon atoms is 6 to 8 having a melt index (MI) of 0.8 to 10 g/10 minutes (ASTM D-1238) and a density of 0.870 to 0.940 g/cm$^3$ (ASTM D-1505) manufactured a liquid proces or vapor process. Very low density L-LDPE resins having a density of less than 0,910 g/cm$^3$ are also preferred.

The EEA resin is a copolymer resin of ethylene and ethyl acrylate, and commercial EEA resins have, for example, a comonomer content of 7 to 41%, a MI of 1.5 to 1500 g/10 minutes (ASTM D-1238), a density of 0.93 to 0.95 g/cm$^3$ (ASTM D-1505) a brittle tempetature of −40° C. to less than −75° C. (ASTM D-746) and a tensile strength of 14 to 160 kg/cm$^2$ (ASTM D-638).

The adhesive polyolefin resin is an modified polyolefin resin which is a polyolefin resin modified by grafting an unsaturated carboxylic acid compound, and includes graft-modified polyethylene resin, graft-modified polypropylene resin and graft-modified ethylene copolymer resin.

The unsaturated carboxylic acid compound usable as the modifier of the polyolefin resin is acrylic acid, methacrylic acid, crotonic acid, isocrotonic acid, fumaric acid, maleic acid, itaconic acid, citraconic acid, angelic acid, tetrahydrophthalic acid, sorbic acid, mesaconic acid, end-cis-bicyclo [2,2,1]-hepto-5-en-2,3-dicarboxylic acid, maleic anhydride, itaconic anhydride, citraconic anhydride, aconitic anhydride, methyl acrylate, methyl methacrylate, ethyl methacrylate, ethyl acrylate, n-butyl acrylate, glycidyl acrylate, glycidyl methacrylate, glycidyl maleate n-buty methacrylate, maleic acid monoethyl ester, maleic acid diethyl ester, fumaric acid monomethyl ester, fumaric acid dimethyl ester, itaconic acid diethyl ester, acrylamide, methacrylamide, maleic acid monoamide, maleic acid diamide, maleic acid-N-monoethylamide, maleic acid-N,N-diethylamide, maleic acid-N-monobutylamide, maleic acid-N,N-dibutylamide, fumaric acid monoamide, fumaric acid diamide, fumaric acid-N-monoethylamide, fumaric acid-N,N-diethylamide, fumaric acid-N-monobutylamide, fumaric acid-N,N-dibutylamide maleimide, N-butylmaleimide, N-phenylmaleimide, malonyl chloride, monomethylmaleate, dimethylmaleate, dipropylmaleate, potassium acrylate, sodium acrylate, zinc acrylate, magnesium acrylate, calcium acrylate, sodium methacrylate, potassium methacrylate, or the like. Two or more unsaturated carboxylic acid compounds may be combined. Preferable unsaturated carboxylic acid compounds are acrylic acid, maleic acid, and maleic anhydride wherein maleic anhydride is particularly preferred. A suitable amount of the unsaturated carboxylic acid compound is 0.01 to 20 parts by weight, preferably 0.2 to 5 parts by weight, per 100 parts by weight of the polyolefin base resin in view of securing adhesive strength.

The grafting modification method may be any known method, such as the method of reacting in a melted state disclosed in Japanese Patent KOKOKU No. 43-27421, the method of reacting in a solution state disclosed in Japanese Patent KOKOKU No. 44-15472, the method of reacting in a slurry state disclosed in Japanese Patent KOKOKU No. 43-18144 and the method of reacting in a vapor state disclosed in Japanese Patent KOKOKU No. 50-77493. Among them, the melting method using an extruder is preferred because of simple operation and inexpensiveness.

A peroxide is added in order to accelerate the reaction between the polyolefin base resin and the unsaturated carboxylic acid, Suitable peroxides are organic peroxides such as benzoyl peroxide, lauroyl peroxide, dicumyl peroxide, $\alpha,\alpha'$-bis(t-butylperoxydiisopropyl)benzene, 2,5-dimethyl-2,5-di(t-butylperoxy)hexane, 2,5-dimethyl-2,5-di(t-butylperoxy)hexyne, di-t-butyl peroxide, cumene hydroperoxide, t-butyl-hydroperoxide, t-butylperoxylaurate, t-butylperoxybenzoate, 1,3-bis(t-butylperoxyisopropyl) benzene, di-t-butyl-diperoxyphthalate, t-butylperoxymaleic acid and isopropyl percarbonate, azo compounds such as azobisisobutyronitrile, and inorganic peroxides such as ammonium persulfate. Two or more peroxides may be combined. Suitable peroxides are di-t-butylperoxide, dicumylperoxide, 2,5-dimethyl -2,5-di(t-butylperoxy)hexane, 2,5-dimethyl-2,5-di (t-butylperoxy)hexyne and 1,3-bis(t-butylperoxyisopropyl) benzene, having a decomposition temperature between 170° C. and 200° C. A suitable amount of the peroxide is 0.005 to 5 parts by weight, preferably 0.01 to 1 part by weight per 100 parts by weight of the polyolefin base resin.

There are commercial acid-modified polyolefin resins, such as "N polymer" (Nippon Petrochemicals), "Admer" (Mitsui Petrochemical Industries), "ER Resin" (Showa Denko), "Novatec-AP" (Mitsubishi Chemical Industries), "Modic" (Mitsubishi Petrochemical), "NUC-Ace" (Nippon Unicar), (Mitsubishi Petrochemical),"NUC-Ace" (Nippon Unicar), "Bondain" (Sumitomo Chemical), "Mercene M" (TOSO) and "CMPS" (Mitsui Dupont Chemical).

In the easily openable package of photographic photosensitive materials of the invention, the photographic photosensitive materials are placed in the part surrounded by the strongly joined portion, and the light-shielding bag is turned over at the edge of the photographic photosensitive materials on the opening side. That is, the photographic photosensitive materials are placed in the part excellent in physical strength, heat seal strength, resistance to the occurrence of pinholes, light-shielding and sealability surrounded by the strongly joined portion and the turned over portion.

The weakly joined portion is preferably provided at an end with at least one unjoined portion for facilitating opening. As the size of the unjoined portion, a suitable length in the direction rectangular to the opening directionis 1 to 30 mm, preferably 3 to 25 mm, more preferably 5 to 20 mm, and a suitable length in the opening direction is not less than 1 mm, preferably not less than 3 mm, more preferably not less than 5 mm. The unjoined portion is preferably provided at a corner of the weakly joined portion in a triangular form. Examples of the photographic photosensitive materials packaged in the package of the invention are:

Silver halide photographic photosensitive materials: films for printing, color photographic printing papers, color films, master papers for printing, DTR photosensitive materials, films and papers for computerized typesetting system, microfilms, films for movie, self-developing type photographic photosensitive materials, direct positive films and papers, etc.

Heat developing photosensitive materials: heat developing color photosensitive materials, heat developing monochromatic photosensitive materials, e.g. disclosed in Japanese Patent KOKOKU Nos. 43-4921, 43-4924, "Shashinkogaku-no-Kiso (Fundamentals of Photographic Engineering), Vol. Silver Salt Photograph", pp 553-555, Corona, 1979, "Research Disclosure", pp 9-15(RD-17029), June, 1978, transfer-type heat developing color photosensitive materials disclosed in Japanese Patent KOKAI Nos. 59-12431, 60-2950, 61-52343, U.S. No. Pat. 4,584,267, etc.

Photosensitive heatsensitive recording materials: recording materials using photothermography (photosensitive heatsensitive image forming method) disclosed in Japanese Patent KOKAI No. 3-72358.

Diazonium photographic photosensitive materials: 4-morpholinobenzene diazonium microfilms, microfilms, copying films, form plates for printing, etc.

Azide, diazide photographic photosensitive materials: photosensitive materials containing parazidobenzoate, 4,4'-diazidostilbene, etc., such as copying films and form plates for printing etc.

Quinone diazide photographic photosensitive materials: photosensitive materials containing ortho-quinone diazide compounds or ortho-naphthoquinone diazide compounds, such as benzoquinone-(1,2)-diazido-(2)-4-sulfonic acid phenyl ether, such as form plates for printing, copying films and contact printing film, etc.

Photo polymers: photosensitive materials, form plates for printing, contact printing films, containing vinyl compound monomer, etc.

Polyvinyl cinnamate esters: printing films, photoresists for IC, etc.

Moreover, the packaging material of the invention is also applicable to various photosensitive materials degraded or denatured by light, oxygen, sulfur dioxide gas or the like, such as foods including peanuts with butter, margarine, snacks, relishs, cakes, teas and lavers, medicines including powder and granular medicines placed in a bag for stomach and bowels and for cold, dyes, pigments, photographic developing agent, photographic fixing agent, toners and the like.

In the easily openable package of photographic photosensitive materials of the invention, since the heat sealed portion of the light-shielding bag is composed of the weakly joined portion and the strongly joined portion, the bag can very easily be opened at the weakly joined portion. Moreover, because of no necessity for improving tearability, the resin used for the light-shielding bag can be selected freely to a certain degree, and thereby, the physical strength of the light-shielding bag can be improved. The photographic photosensitive materials are surrounded by the strongly joined portion and the turned over portion, and therefore, the sealability and light-shielding are ensured even through pinholes occur at the weakly joined portion.

Figure 2:
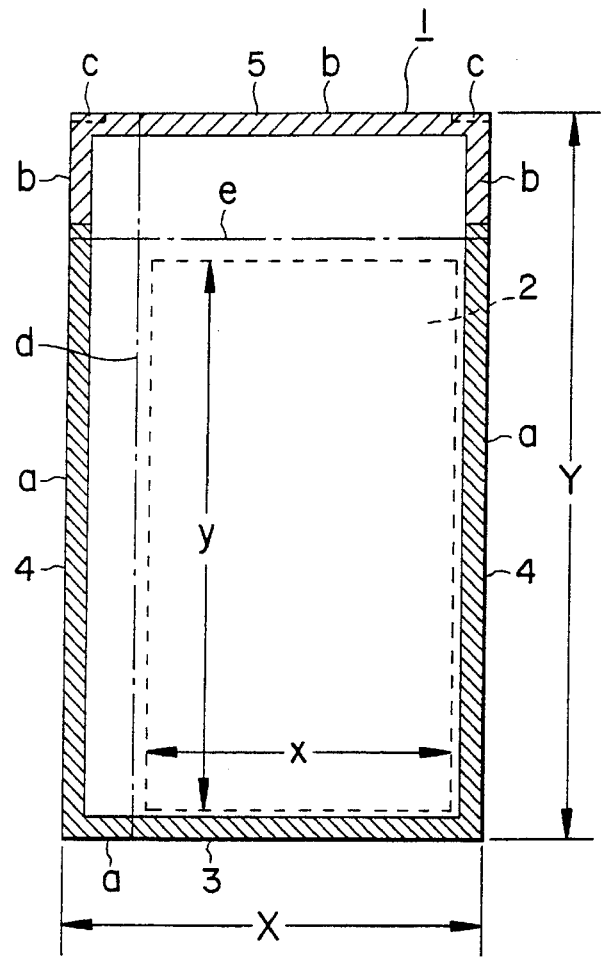
FIG. 2 is a plan view illustrating the developed state thereof.

An embodiment of the package of the invention is shown in FIGS. 1 and 2. The light-shielding bag 1 is formed in a rectangular shape, and the photographic photosensitive materials 2 having an almost similar figure are placed therein. The periphery is heat-sealed, and the bottom portion 3 and both side portions 4,4 near the top portion 5 are formed by the strongly joined portion a having a great joining strength. The top portion 5 and remaining both side portions 4,4 are formed by the weakly joined portion b having a small joining strength, and unjoined portions c are formed at both ends of the top portion 5. The joining strength (T peeling strength) of the strongly joined portion a is preferably not less than 1300 g/15 mm width, more preferably not less than 1500 g/15 mm width. The joining strength of the weakly joined portion b is preferably not more than 1000 g/15 mm width, more preferably not more than 700 g/15 mm width. The lower limit of the joining strength is, in view of openability, preferably less, but in view of resistance to separation at heat-sealed portion, preferably not less than 10 g/15 mm width, more preferably not less than 50 g/15mm widths, particularly preferably not less than 100 g/15 mm width.

The length X of the bottom portion 3 is greater than the width x of the photographic photosensitive materials 2, and the length of the strongly joined portion a at both side portions 4,4 is longer than the longitudinal length y of the photographic photosensitive materials 2. As a result, the photographic photosensitive materials 2 are placed in the light-shielding bag 1 in the state surrounded by the strongly joined portion a of the bottom portion 3 and of both side portions 4,4.

The light-shielding bag 1 is successively turned over at dashed lines d,e shown in FIG. 2 to be made in the form shown in FIG. 1. Thus, in the package, the photographic photosensitive materials 2 placed therein is surrounded by the strongly joined portion a of the bottom portion 3, the strongly joined portion a of one side portion 4 and two turned over portions d,e.

The layer construction of some light-shielding films usable for the light-shielding bag is shown in FIG. 3 through 12.

Figure 3:
FIGS. 3 through 12 are partially sectional views respectively illustrating the layer construction of various light-shielding films applicable to the package of the invention.

The light-shielding film of FIG. 3 is composed of a strongly joining layer 11 with a stripe coat of a weakly joining layer 12 at a prescribed portion.

Figure 4:
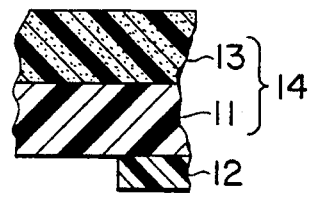

The light-shielding film of FIG. 4 is composed of a coextruded film 14 consisting of a strongly joining layer 11 and a light-reflective thermoplastic resin layer 13 with a stripe coat of a weakly joining layer 12 at a prescribed portion.

Figure 5:
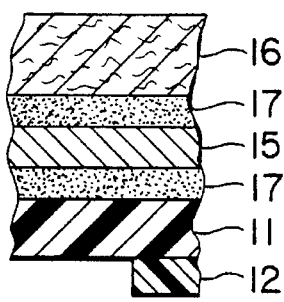

The light-shielding film of FIG. 5 is composed of a strongly joining layer 11, an aluminum foil 15 and an unbleached kraft paper 16 laminated from the inside each through an adhesive layer 17, with a stripe coat of a weakly joining layer 12 at a prescribed portion.

Figure 6:
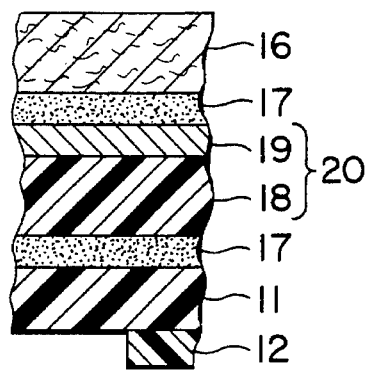

The light-shielding film of FIG. 6 is composed of a strongly joined layer 11, an aluminum-metallized biaxially stretched nylon 6 resin film layer 20 consisting of a biaxially stretched nylon 6 resin film 18 and an aluminum membrane 19 formed by vacuum deposition, and an unbleached kraft paper 16 laminated from the inside each through an adhesive layer 17, with a stripe coat of a weakly joining layer 12.

Figure 7:

The light-shielding film of FIG. 7 is a single layer film composed of a light-absorptive thermoplastic resin film 21.

Figure 8:

The light-shielding film of FIG. 8 is a single layer film composed of a light-reflective thermoplastic resin film 13.

Figure 9:

The light-shielding film of FIG. 9 is a coextruded double layer film 22 composed of a light-absorptive thermoplastic resin film 21 and a light-reflective thermoplastic resin film 13.

Figure 10:
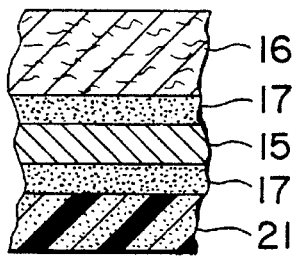

The light-shielding film of FIG. 10 is the same as that of FIG. 5, except that the weakly joining layer 12 is not formed and that the strongly joining layer 11 is changed to a light-absorptive thermoplastic resin film 21.

Figure 11:
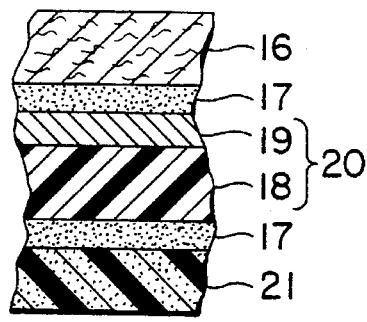

The light-shielding film of FIG. 11 is the same as that of FIG. 6, except that the weakly joining layer 12 is not formed and that the strongly joining layer is changed to a light-absorptive thermoplastic resin film 21.

Figure 12:
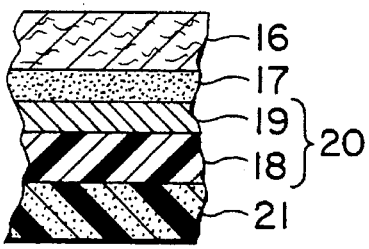

The light-shielding film of FIG. 12 is composed of a light-absorptive thermoplastic resin film 21, an aluminum-metallized biaxailly stretched nylon 6 resin film 20 directly laminated thereonto, and an unbleached kraft paper 16 laminated further thereonto through an adhesive layer 17.

Figure 13:
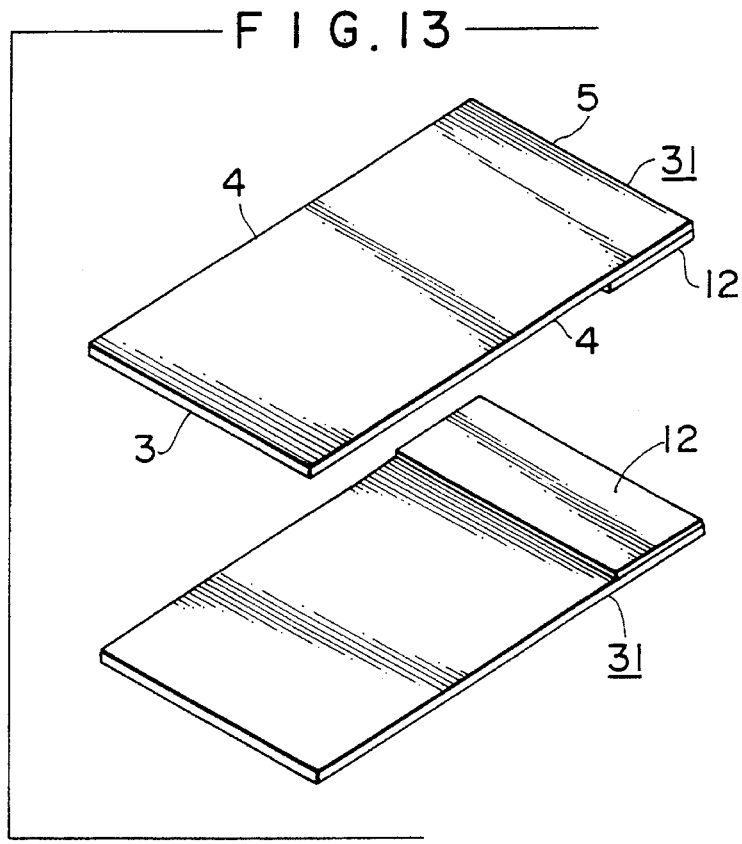
FIGS. 13 through 15 are perspective views illustrating the process of making the package of the invention.

When the above package is prepared, two light-shielding films 31 formed in a prescribed size and a prescribed form are superposed so that the weakly joining layers 12 are facing to each other as shown in FIG. 13. Then, the bottom portion 3 and both side portions 4,4 are heat-sealed under the same heat sealing conditions at the same temperature at the same pressure for the same time to form the light-shielding bag of which three sides are heat-sealed. Thereby, the heat-sealed portion at the weakly joining layer becomes the weakly joined portion b. The photographic photosensitive materials are put therein, and the top portion 5 is heat-sealed. The prescribed portions are turned over as shown in FIG. 1 to complete the package of the photographic photosensitive materials.

Figure 14:
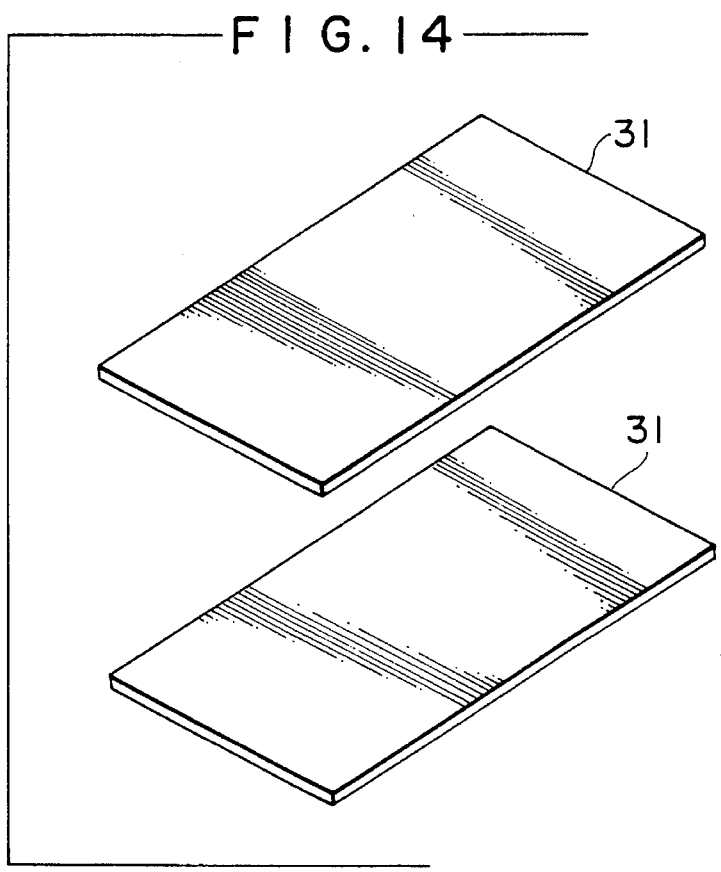
Figure 15:
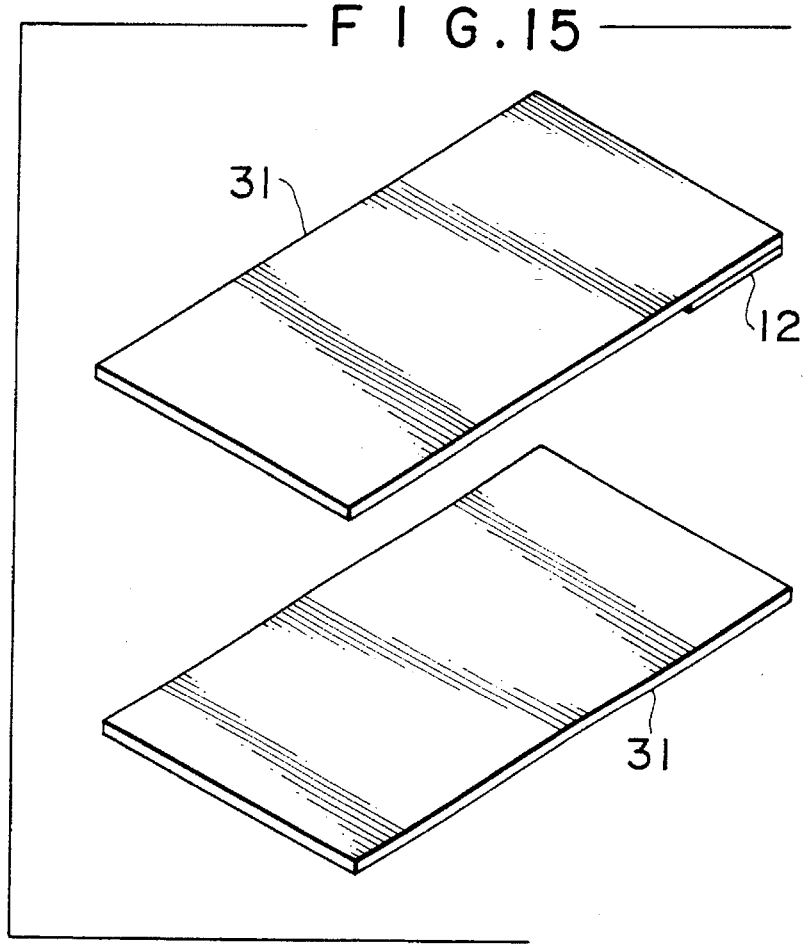

In the case of using the light-shielding film not provided with a weakly joining layer, two light-shielding films 31 are superposed as shown in FIG. 14, and heat-sealed at the same heat sealing temperature for the same time. The weakly joined portion is formed at a low heat sealing pressure, and the strongly joined portion is formed at a high heat sealing pressure.

Another light-shielding bag is formed using a light-shielding film 31 provided with a weakly joining layer 12 and a light-shielding film 31 not provided with a weakly joining layer. The above two light-shielding film 31 are superposed so that the weakly joining layer 12 is disposed on the inside, and heat-sealed under the same heat sealing conditions. As a result, the weakly joined portion is formed at the weakly joining layer.

EXAMPLES

Example 1

A light-shielding film shown in FIG. 6 was used, and a package shown in FIG. 1 was prepared.

The strongly joining layer 11 was composed of 96.3 wt. % of ethylene-octene-1 copolymer resin, 0.05 wt. % of erucic amide, 0.05 wt. % of a phenol antioxidant, 0.2 wt. % of calcium stearate, 3 wt. % of oil furnace carbon black, 0.1 wt. % of 5,8-dimethyltocotrienol and 0.3 wt. % of fatty acid glycerine monoester, and had a thickness of 70 μm. The adhesive layer 17 was an extrusion laminating layer 15 μm in thickness, and was composed of low density homopolyethylene resin having a MI of 4.7 g/10 minutes and a density of 0.918 g/cm³ manufactured by the high pressure radical polymerization process. The aluminum-metallized biaxially stretched nylon 6 resin film layer 20 having a thickness of 15 μm was composed of a biaxially stretched nylon 6 resin film 18 having a thickness of 15 μm and an aluminum membrane 400Å in thickness formed by vacuum deposition. The unbleached kraft paper 16 had an areal weight of 50 g/m² and pH 5.5.

The weakly joining layer 12 having a thickness of 20 μm was composed of 60 wt. % of ethylene-butene-1 copolymer resin, 15 wt. % of LDPE resin and 25 wt. % of saponified ethylene-vinyl acetate copolymer having an ethylene content of 77% and a saponification value of 85%.

The laminated film composed of the above strongly joining layer 11, the aluminum-metallized biaxially stretched nylon 6 resin film layer 20, the unbleached kraft paper 16 and the adhesive layer was formed through one process using a tandem laminating apparatus provided with two T dies, and then, the weakly joining layer 12 was laminated onto the strongly joining layer 11 by extrusion laminating using a single laminating apparatus provided with one T die to complete the light-shielding film.

The light-shielding films were superposed so that the weakly joining layers 12,12 were faced each other similar to FIG. 13, and the three sides were heat-sealed to obtain a light-shielding bag. Photographic photosensitive materials placed in an interleaf was called a set, and 100 sets were superposed. The superposed materials were placed in a U-shaped paper board 800 μm in thickness, and put into the light-shielding bag, and the top portion was heat-sealed to complete the package. The joining strength of the weakly joined portion was 725 g/15 mm width, and that of the strongly joined portion was 3526 g/15 mm width. A/B was 0.20.

Figure 16:
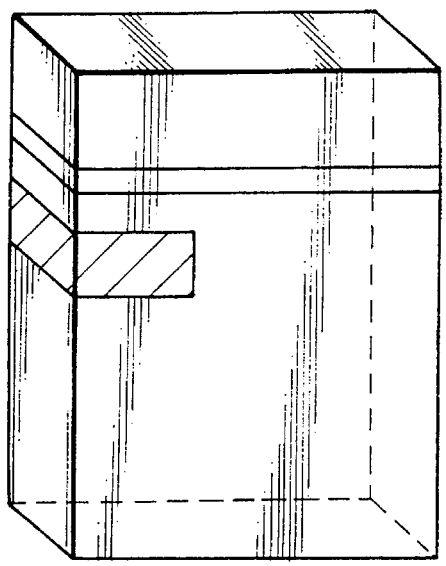
FIG. 16 is a perspective view of a faucet-type light-shielding box wherein the package of the invention is placed.

The size of the light-shielding bag was 31 cm in lateral length (the bottom and top length indicated by X in FIG. 2), 42 cm in longitudinal length (the side length indicated by Y in FIG. 2), 7 mm in width of the strongly joined portion a, 7 mm in width of the weakly joined portion at both side portions, 15 mm in width of the weakly joined portion at the top portion, 350 mm in length of the strongly joined portion at both side portions and 70 mm in length of the weakly joined protin at both side portions. The size of the photographic photosensitive materials was 25.4 cm in lateral length and 30.5 cm in longitudinal length. Each unjoined portion was 8 mm in length in the opening direction and 50 mm in length in lateral direction. The package was placed in a faucet-type light-shielding box having a label portion for discriminating the package so that various articles packaged by a different bag could be packaged by using the box having the same design and the same size, as shown in FIG. 16. The space between the box and the package 90 mm in longitudinal direction and 10 mm in lateral direction.

In the easily openable package of photographic photosensitive materials, pinholes and separation of heat-sealed portion did not occur through packaging work and transportation to users. The physical strength was great even at the weakly joined portion, and bag rupture strength was superior to a conventional easily openable package. Bag rupture troubles were sharply reduced due to the smaller space between the faucet-type black light-shielding box and a cushioning effect. When a part of the photographic photosensitive material were used, the weakly joined portion could be peeled very easily by hand. Since the strongly joined portion remained without separation, the remaining photographic photosensitive materials could be sealed and shielded from an electric light and sunlight by turning over at the strongly joined portion and placing in the faucet-type black light-shielding box.

Example 2

A light-shielding film shown in FIG. 4 was used, and a package shown in FIG. 1 was prepared.

The light-reflective thermoplastic resin film layer 13 having a thickness of 50 μm was composed of ethylene-4-methylpentene-1 copolymer resin having a MI of 2.1 g/10 minutes and a density of 0.953 g/cm³ containing 20 wt. % of high density homopolyethylene resin having a MI of 1.7 g/10 minutes, a density of 0.951 g/cm³ and a Vicat softening point of 125° C., 1 wt. % of titanium dioxide, 1 wt. of aluminum paste, 0.05 wt. % of oleic amide, 0.2 wt. % of calcium stearate, 0.3 wt. % of dimethylpolysiloxane having a viscosity of 10,000 centi stokes and 0.1 wt. % of 5.8-dimethylpolysiloxane.

The strongly joining layer 11 having a thickness of 50 μm was composed of ethylene-hexene-1 copolymer resin having a MI of 2.0 g/10 minutes and a density of 0.920 g/cm³ containing 3 wt. % of oil furnace carbon black, 0.5 wt. % of diglycerine monostearate ester, 0.05 wt. % of erucic amide, 0.1 wt. % of tetrakis [methylene-3(3',5'-di-t-butyl-4'hydroxyphenyl)propionate]methane and 0.1 wt. % of synthetic silica.

The weakly joining layer 12 having a thickness of 20 μm was composed of EVA hot melt adhesive.

As the production of the light-shielding film having the above layer construction, the light-reflective thermoplastic resin film 13 and the strongly joining layer 11 were formed by the double layer coextrusion inflation process, and the weakly joining layer 12 was formed thereon by coating using an applicator.

The light-shielding films were superposed so that the weakly joining layers 12,12 were facing each other similar to FIG. 13, and the three sides were heat-sealed to obtain a light-shielding bag. Photographic photosensitive materials placed in an interleaf was called a set, and 50 sets were superposed. The superposed materials were placed in a U-shaped paper board 1000 μm in thickness, and put into tile light-shielding bag, and the top portion was heat-sealed to complete the package. The joining strength of the weakly joined protin was 287 g/15 mm width, and that of the strongly joined portion was 3268 g/15 mm width. A/B was 0.09.

The size of the light-shielding bag was 42 cm in lateral length (the bottom and top length indicated by X in FIG. 2), 55 cm in longitudinal length (the side length indicated by Y in FIG. 2), 5 mm in width of the strongly joined portion a, 7 mm in width of the weakly joined portion at both side portions, 15 mm in width of the weakly joined portion at the top portion, 500 mm in length of the strongly joined portion at both of the strongly joined portion at both side portions and 50 mm in length of the weakly joined portion at both side portions. The size of the photographic photosensitive materials was 35.6 cm in lateral length and 43.2 cm in longitudinal length. Each unjoined portion was 7 mm in length in the opening direction and 30 mm in length in lateral direction. The package was placed in a faucet-type light-shielding box, as shown in FIG. 16. The space between the box and the package 80 mm in longitudinal direction and 10 mm in lateral direction.

In the easily openable package of photographic photosensitive materials, pinholes and separation of heat-sealed portion did not occur through packaging work and transportation to users. The physical strength was great even at the weakly joined portion, and bag rupture strength was superior to a conventional easily openable package. Bag rupture troubles were sharply reduced due to the smaller space between the faucet-type black light-shielding box and a cushioning effect. When a part of the photographic photosensitive material were used, the weakly joined portion could be peeled very easily by hand. Since the strongly joined portion remained without separation, the remaining photographic photosensitive materials could be sealed and shielded from an electric light and sunlight by turning over at the strongly joined portion and placing in the faucet-type black light-shielding box.

Example 3

A light-shielding film shown in FIG. 4 was used, and a package shown in FIG. 1 was prepared.

The light-reflective thermoplastic resin film layer 13 and the strongly joining layer 11 were the same as Example 2.

The weakly joining layer 12 having a thickness of 20 μm was composed of 30 wt. % of ethylene-butene-1 random copolymer resin having a MI of 2.1 g/10 minutes and a density of 0.890 g/cm$^3$, 50 wt % of low density homopolyethylene resin having a MI of 2.0 g/10 minutes and a density of 0.918 g/cm$^3$ manufactured by the high pressure radical polymerization process and 20 wt. % of homopolypropylene resin having a MI of 6.1 g/10 minutes.

As the production of the light-shielding film having the above layer construction, the light-reflective thermoplastic resin film 13 and the strongly joining layer 11 were formed by the double layer coextrusion inflation process, and the weakly joining layer 12 was formed thereon by coating using an application.

The light-shielding films were superposed so that the weakly joining layers 12,12 were faced each other similar to FIG. 13, and the three sides were heat-sealed to obtain a light-shielding bag. Photographic photosensitive materials placed in an interleaf were put into the light-shielding bag, and the top portion was heat-sealed to complete the package. The joining strength of the weakly joined portion was 562 g/15 mm width, and that of the strongly joined portion was 3276 g/15 mm width. A/B was 0.17.

The other construction, size and the like were the same as Example 2.

In this package, similar results and effects to Example 2 were obtained.

Example 4

Using the light-shielding film shown in FIG. 5, the package shown in FIG. 1 was prepared.

The strongly joining layer 11 having a thickness of 40 μm was composed of 94.8 wt. % of ethylene-4-methylpentene-1 copolymer resin, 0.05 wt. % of oleic amide, 1.5 wt. % of dimethylpolysiloxane, 0.05 wt. % of a phenol antioxidant, 0.05 wt. % of a phosphorous-containing antioxidant, 0.15 wt. % of calcium stearate, 3 wt. % of oil furnace carbon black and 0.4 wt. % of fatty acid glycerine monoester.

The adhesive layer 17 having a thickness of 15 μm was an extrusion laminating layer composed of 75 wt. % of low density homopolyethylene resin having a MI of 4.7 g/10 minutes and a density of 0.918 g/cm$^3$ manufactured by the high pressure radical polymerization process and 25 wt. % of an adhesive resin (acid-modified resin, "Bondain LX411", Sumitomo Chemical) having a MI of 5 g/10 minutes and a density of 0.93 g/cm$^3$.

The aluminum foil 15 was soft aluminum 7 μm in thickness of which the mat side was disposed on the strongly joining layer side.

A bleached kraft paper of pH 5.3 having an areal weight of 50 g/m$^2$ not affecting photographic photosensitive materials adversely was used instead of the unbleached kraft paper.

The weakly joining layer 12 having a thickness of 20 82 m was composed of Zn-type ionomer having a MI of 5 g/10 minutes and a density of 0.94 g/cm$^3$.

The laminated film composed of the above strongly joining layer 11, the aluminum foil 15, the bleached kraft paper 16 and the adhesive layer 17 was formed through one process using a tandem laminating apparatus provided with two T dies, and then, the weakly joining layer 12 was laminated onto the strongly joining layer 11 by extrusion laminating using a single laminating apparatus provided with one T die to complete the light-shielding film.

Using the light-shielding film, the same easily openable package of photographic photosensitive materials as Example 1 was prepared, and the results and effects similar to Example 1 were obtained. The joining strength of the weakly joined portion was 853 g/15 mm width, and that of the strongly joined portion was 2638 g/15 mm width. A/B was 0.32.

Example 5

Using the light-shielding film shown in FIG. 4, the package shown in FIG. 1 was prepared.

The light-reflective thermoplastic resin film layer 13 and the strongly joining layer 11 were the same as Example 2.

The weakly joining layer 12 having a thickness of 20 μm was composed of Na-type ionomer resin having a MI of 5 g/10 minutes and a density of 0.94 g/cm$^3$.

The light-shielding film having the above layer construction was prepared by the same method as Example 3.

The light-shielding films were superposed so that the weakly joining layers 12,12 were facing each other similar to FIG. 13, and the three sides were heat-sealed to obtain a light-shielding bag. Photographic photosensitive materials placed in an interleaf were put into the light-shielding bag, and the top portion was heat-sealed to complete the package. The joining strength of the weakly joined portion was 358 g/15 mm width, and that of the strongly joined portion was 3248 g/15 mm width. A/B was 0.11.

The other construction, size and the like were the same as Example 2.

In this package, similar results and effects to Example 2 were obtained.

Example 6

The light-reflective thermoplastic resin film layer 13 of 50 μm in thickness and the strongly joining layer 11 of 50 μm in thickness each having the same resin composition as Example 2 were coextruded to form a coextruded double layer inflation film.

Two sheets of the coextruded double layer inflation films were superposed so that the strongly joining layers 11 faced each other, and three sides were heat-sealed. The hot bar for heat sealing was formed so that the part for the weakly joined portion was indented 2.5 mm from the part for the strongly joined portion, and thereby, the heat seal strength at the weakly joined portion was rendered smaller than the strongly joined portion by heat sealing at the same temperature for the same time. The part for the unjoined portion was idented 5.0 mm so as not to be heat-sealed.

As a result, the joining strength of the weakly joined portion was 484 g/15 mm width, and that of the strongly joined portion was 3526 g/15 mm width. A/B was 0.14. The photographic photosensitive materials were placed in an interleaf.

The other construction, size and the like were the same as Example 2.

In this package, similar results and effects to Example 2 were obtained.

Example 7

A light-shielding inflation film 100 μm in thickness was formed using the resin composition composed of 51.9 wt. % propylene-ethylene block copolymer resin having a MI of 5 g/10 minutes and a density of 0.90 g/cm$^3$, 35 wt. % of high density homopolyethylene resin having a MI of 0.7 g/10 minutes and a density of 0.951 g/cm$^3$, 10 wt % of ethylene-vinyl acetate copolymer resin having a vinyl acetate content of 7 wt. %, 3 wt. % of oil furnace carbon black, 0.05 wt. % of erucic amide and 0.05 wt. % of a phenol antioxidant. The light-shielding inflation film was used as the weakly joining layer 12. After the surface was treated with corona discharge, an extrusion laminating layer composed of 55 wt. % of ethylene-butene-1 copolymer resin having. a MI of 8 g/10 minutes and a density of 0.92 g/cm$^3$, 35 wt. % of low density homopolyethylene resin and 10 wt. % of adhesive resin (acid-modified polyolefin resin "Bondain LX411" Sumitomo Chemical) was stripe coated as the strongly joining layer 11. In the layer construction of FIG. 3, 11 and 12 are reversed.

Two sheets of the light-shielding films were superposed so that the weakly joining layers 12 faced each other, and three sides were heat-sealed. Then, the photographic photosensitive materials were put thereinto, and the top portion was heat-sealed to complete the package.

The joining strength of the weakly joined portion was 648 g/15 mm width, and that of the strongly joined portion was 1853 g/15 mm width. A/B was 0.35. The photographic photosensitive materials were placed in an interleaf. The other construction, size and the like were the same as Example 2.

In this package, similar results and effects to Example 2 were obtained.

Comparative Example 1

Two sheets of a coextruded double layer inflation film 100 μm in thickness composed of the light-reflective thermoplastic resin film layer 13 of 50 μm in thickness and the strongly joining layer 11 of 50 μm in thickness each having the same resin composition as Example 2 were superposed so that the strongly joining layers 11 faced each other, and three sides were heat-sealed. In the light-shielding bag, the heat seal strength of all heat-sealed portions exceeded 3000 g/15 mm width, and the bag could not be opened from the unjoined portion.

Comparative Example 2

In the light-shielding bag of Example 2, the weakly joining layer 12 was coated not as a stripe but the whole surface of the strongly joining layer 11.

Two sheets of the light-shielding films were superposed so that the weakly joining layers 12 faced each other, and three sides were heat-sealed. Then, the photographic photosensitive materials were put thereinto, and the top portion was heat-sealed to complete the package having the same size as Example 2.

The joining strength was 263 g/15 mm width, and sealability and light-shielding could not be ensured due to the occurrence of pinholes and separation of heat-sealed portion.

In Examples 1 to 7 and Comparative Examples 1 to 2, the heat sealing was conducted at a pressure of 1 kg/cm$^2$ for 1 second. The heat sealing temperature was an optimum temperature to ensure heat sealability for each light-shielding film. In the specification, joining strength means T peeling strength.

We claim:

1. An easily openable package of photographic photosensitive materials which comprises one or a plurality of photographic photosensitive materials and a light-shielding bag having a heat-sealed portion formed on the periphery and packaging; the photographic photosensitive materials, the heat-sealed portion comprising a strongly joined portion formed of a polyolefin resin layer containing more than 5 wt. % of ethylene copolymer resin and a lubricant, said strongly joined portion further having a thickness of not less than 20 μm and having a joining strength of not less than 1300 g/15 mm width and a weakly joined resin portion having a joining strength of 10 to 1200 g/15 mm with and wherein the joining strength of the weakly joined resin portion is less than or equal to 0.7 time as much as the joining strength of the strongly joined portion, the strongly joined portion of the light-shielding bag being larger than the photographic photosensitive materials being packaged therein thereby forming a space, and the lightshielding bag being turned over at least at the edge of the photographic photosensitive materials on an opening side formed of the weakly joined resin portion so that when the light-shielding bag has the edge in the turned over position, the photographic photosensitive materials can not contact the weakly joined portion.

2. The easily openable package of claim 1 wherein an unjoined portion is provided adjacent to the weakly joined portion 3. The easily openable package of claim 2 wherein the unjoined portion is formed on the opening side.

4. The easily openable package of claim 1 wherein a weaking joining layer is stripe coated for the weakly joined portion.

5. The easily openable package of claim 4 wherein the weakly joining layer is a polyolefin resin layer containing more than 50 wt. % of a blend of two or more thermoplastic resins and having a joining strength of not more than 1000 g/15 mm width.

6. The easily openable package of claim 1 wherein the weakly joined portion is formed by heat sealing identical heat sealing layers.

7. The easily openable package of claim 1 wherein the weakly joined portion is formed by heat sealing different heat sealing layers.

8. The easily openable package of claim 1 wherein a weakly adhesive layer is stripe coated for the weakly joined portion.

9. The easily openable package of claim 1 wherein a strongly joining layer is stripe coated for the strongly joined portion.

10. The easily openable package of claim 1 wherein, the strongly joined portion is formed of a resin selected from the group consisting of ethylene copolymer resins and adhesive polyolefin resins.

11. The easily openable package of claim 1 wherein the package is openable in a direction from a side formed from the weakley joined portion towards photographic photosensitive materials and the weakly joined portion extends from said side in the direction of opening for from 3 to 60 mm.

12. The easily openable package of claim 1 wherein the package is openable in a direction from a side formed from the weakly joined portion towards the photographic photosensitive materials, the space extends from 5 to 50 mm in the direction of opening, the weakly joined portion extends from said side formed from the weakly joined portion in the direction of opening for from 3 to 60 mm and said side formed from the weakly joined portion is from 5 to 50 min.

13. The easily openable package of claim 1 wherein weight of the photographic photosensitive materials is greater than 500 grams.

14. The easily openable package of claim 1 wherein the photographic photosensitive materials are in sheet form.

15. The easily openable package of claim 1 wherein said ethylene copolymer resin is an ethylene-αolefin copolymer resin.

* * * * *